United States Patent [19]

Defour et al.

[11] Patent Number: 5,321,489
[45] Date of Patent: Jun. 14, 1994

[54] METHOD FOR THE AVOIDANCE OF COLLISIONS BETWEEN AIRCRAFT AND ONBOARD OPTICAL SET DESIGNED FOR ITS IMPLEMENTATION

[75] Inventors: Martin Defour, Croissy S/Seine; Benoist Grossmann, Paris, both of France

[73] Assignee: Thomson-CSF, Puteaux, France

[21] Appl. No.: 961,621

[22] Filed: Oct. 16, 1992

[30] Foreign Application Priority Data

Oct. 18, 1991 [FR] France .................. 91 12884

[51] Int. Cl.$^5$ .............................................. G01C 3/08
[52] U.S. Cl. ............................................ 356/5; 342/29
[58] Field of Search ............... 356/4, 5, 152; 340/961; 342/29

[56] References Cited

U.S. PATENT DOCUMENTS

| | | | |
|---|---|---|---|
| 4,277,170 | 7/1981 | Miles | 356/152 |
| 4,527,158 | 7/1985 | Runnels | 356/152 X |
| 4,755,818 | 7/1988 | Conrad | 340/961 |
| 4,925,303 | 5/1990 | Pusic | 356/152 |

*Primary Examiner*—Mark Hellner
*Attorney, Agent, or Firm*—Oblon, Spivak, McClelland, Maier & Neustadt

[57] ABSTRACT

A method and system for the avoidance of collisions among aircraft in which monochromatic radiation is transmitted from an aircraft fitted out with a wide-field optical transceiver. The monochromatic radiation scans the space around the aircraft which defines a zone of proximity. Optical radiation is returned after back reflection off objects which may be sources of danger constituted by other aircraft that have entered the zone of proximity. The radiation received is detected and then processed to deduce therefrom the direction and, as the case may be, the distance of the source of danger. Such a method can be applied especially to the avoidance of collision between non-cooperating aircraft.

8 Claims, 2 Drawing Sheets

METHOD FOR THE AVOIDANCE OF COLLISIONS BETWEEN AIRCRAFT AND ONBOARD OPTICAL SET DESIGNED FOR ITS IMPLEMENTATION

BACKGROUND OF THE INVENTION

1. Field of the Invention

The invention relates to the field of air traffic and, more particularly, its object is a collision-avoidance method for aircraft and an optical set to be taken on board aircraft in order to implement it.

The need for aircraft to be able to maneuver in conditions of low visibility or in dense traffic zones necessitates the use of systems enabling the avoidance of collisions.

2. Description of the Prior Art

Anti collision systems using transmission by radio or by radar waves have been developed.

Systems known as TCAS (Traffic Alert and Collision Avoidance Systems) use interrogators on the ground and transponders carried by aircraft capable of responding as interrogated, if necessary by the addition, to their response code, of information elements relating for example to their altitude. These systems, of the secondary surveillance radar type, are complicated systems that are very costly.

Other types of systems have been developed, using methods of communication by radio waves and therefore requiring radio dialog for the localization of danger or threats. These systems, apart from their complexity, cannot be used to obtain the fast responses that are indispensable in the event of a risk of collision, and some Of them are subject to the hazards of transmission in certain particular conditions, for example fading, echos, etc.

SUMMARY OF THE INVENTION

An object of the invention is a simple, fast-response method of collision avoidance for aircraft, that requires no response from nearby aircraft presenting a risk of collision, and does not necessitate the presence of any matched response system on board the other aircraft.

According to the invention, there is proposed a method for the avoidance of collision among aircraft, said method consisting:

in transmitting a monochromatic radiation from an aircraft fitted out with wide-field optical transceiver means, said monochromatic radiation scanning the space around the aircraft and thus defining a zone of proximity;

in receiving the optical radiation that may be returned after back reflection by sources of danger constituted by other aircraft that have entered the zone of proximity;

and in detecting the radiation received and in then processing the corresponding signal to deduce therefrom the direction and, if necessary, the distance of the source of danger.

An object of the invention is also an optical set designed to be taken on board aircraft, for the implementation of this collision-avoidance method.

BRIEF DESCRIPTION OF THE DRAWINGS

The invention will be understood more clearly and other characteristics will appear from the following description, made with reference to the appended drawings, of which.

MORE DETAILED DESCRIPTION

As indicated here above, the collision-avoidance uses means having a wide scanning angle for the transmission and reception of pulsed monochromatic light waves, and the method consists in carrying out a short-range telemetry operation that is repeated a large number of times to cover the entire volume of space, thus defining a zone of proximity around the carrier aircraft. An optical radiation reflected by an aircraft that has entered the zone of proximity of the aircraft fitted out with the system will be detected by the transceiver means and the direction of the source of danger will be obtained at the same time.

Figure 1A:
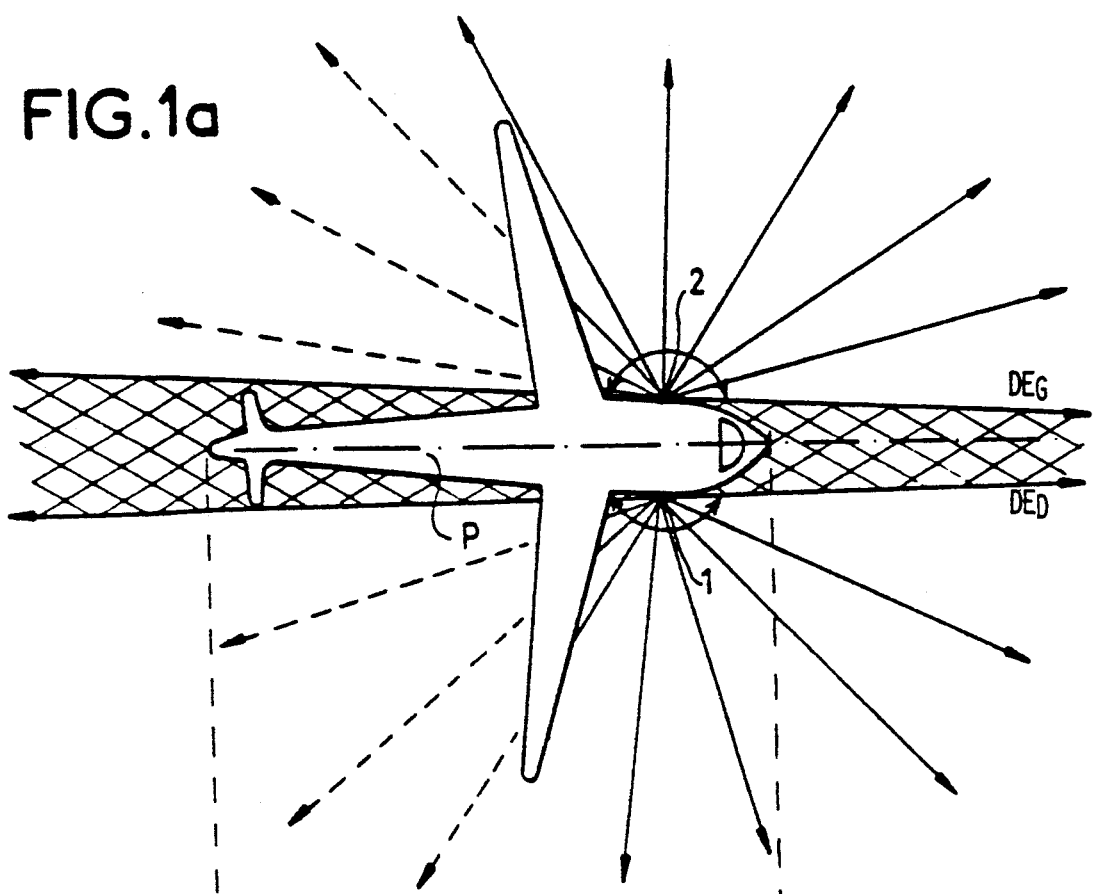
FIGS. 1a and 1b are drawings illustrating the coverage of the proximity zone of an aircraft in one mode of implementation of the method according to the invention.
Figure 1B:
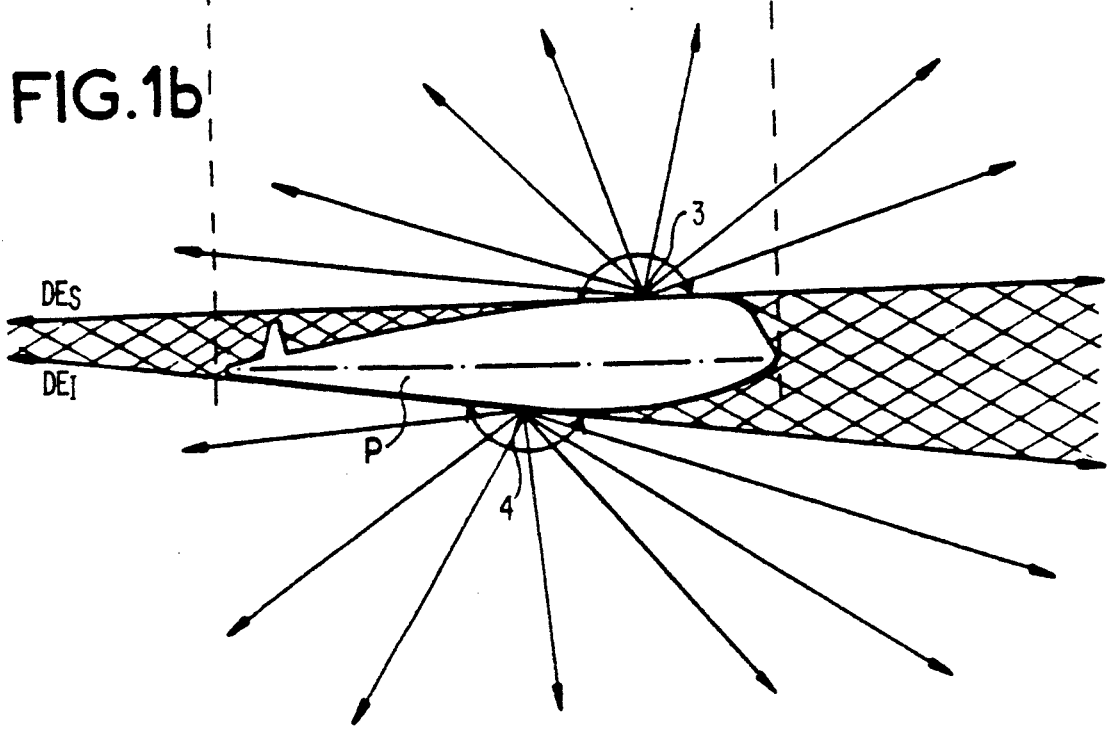

To this end, in one embodiment, each aircraft is fitted out with at least two optical transceiver systems, placed symmetrically on each side of the carrier, each system being capable of covering $2\pi$ steradians. FIGS. 1a and 1b show how it is possible to cover practically the entire proximity zone of a carrier P. In FIG. 1a, which shows a sectional view of the carrier in the "plane" of the wings, two optical transceiver systems 1 and 2 have been placed symmetrically on each side of the plane of symmetry of the carrier P; since the optical axes are not quite parallel, the half-spaces $DE_D$ to the right and $DE_G$ to the left are overlapping towards the front but leave a dihedron of shadow. The vertex of this dihedron is at a short distance in front of the nose of the aircraft and the dihedron widens towards the rear. Furthermore, the wings create a small shadow zone in these half spaces that causes little inconvenience since the volume concealed is small and since the carriers are moving.

In FIG. 1b, which shows a sectional view of the carrier in its vertical plane, two optical transceiver systems 3 and 4 have been placed in the vicinity of the top and bottom points of the aircraft to cover respectively the upper half space $DE_S$ and lower half-space $DE_I$. As in FIG. 1a, since their optical axes are angularly offset, a dihedron of shadow is defined. The vertex of this dihedron is at a short distance from the rear of the carrier and the dihedron opens out towards the front.

Depending on the type of aircraft and on the possible zones for the installation of the optical transceiver systems, and taking, if necessary, other useful criteria into consideration, a full set of optical equipment for an aircraft could comprise:

only two systems as shown in either of the FIGS. 1a and 1b;

three systems, for example the two systems illustrated in FIG. 1a and a complementary system placed in the tail of the aircraft to cover the dihedron of shadow illustrated in FIG. 1a, or the two systems illustrated in FIG. 1b and a complementary system placed in the nose of the aircraft to cover the dihedron of shadow illustrated in FIG. 1b. A configuration such as this enables a complete coverage of the proximity zone;

more than three systems, and notably four, to ensure complete coverage of the proximity zone with redundancy if necessary; a configuration of this type with more than three systems can also be used to cover the entire proximity zone even if the scanning angle covered by each system is smaller than $2\pi$ steradians.

Indeed, as shall be explained hereinafter, the cost of each transceiver system can be low.

Figure 2:
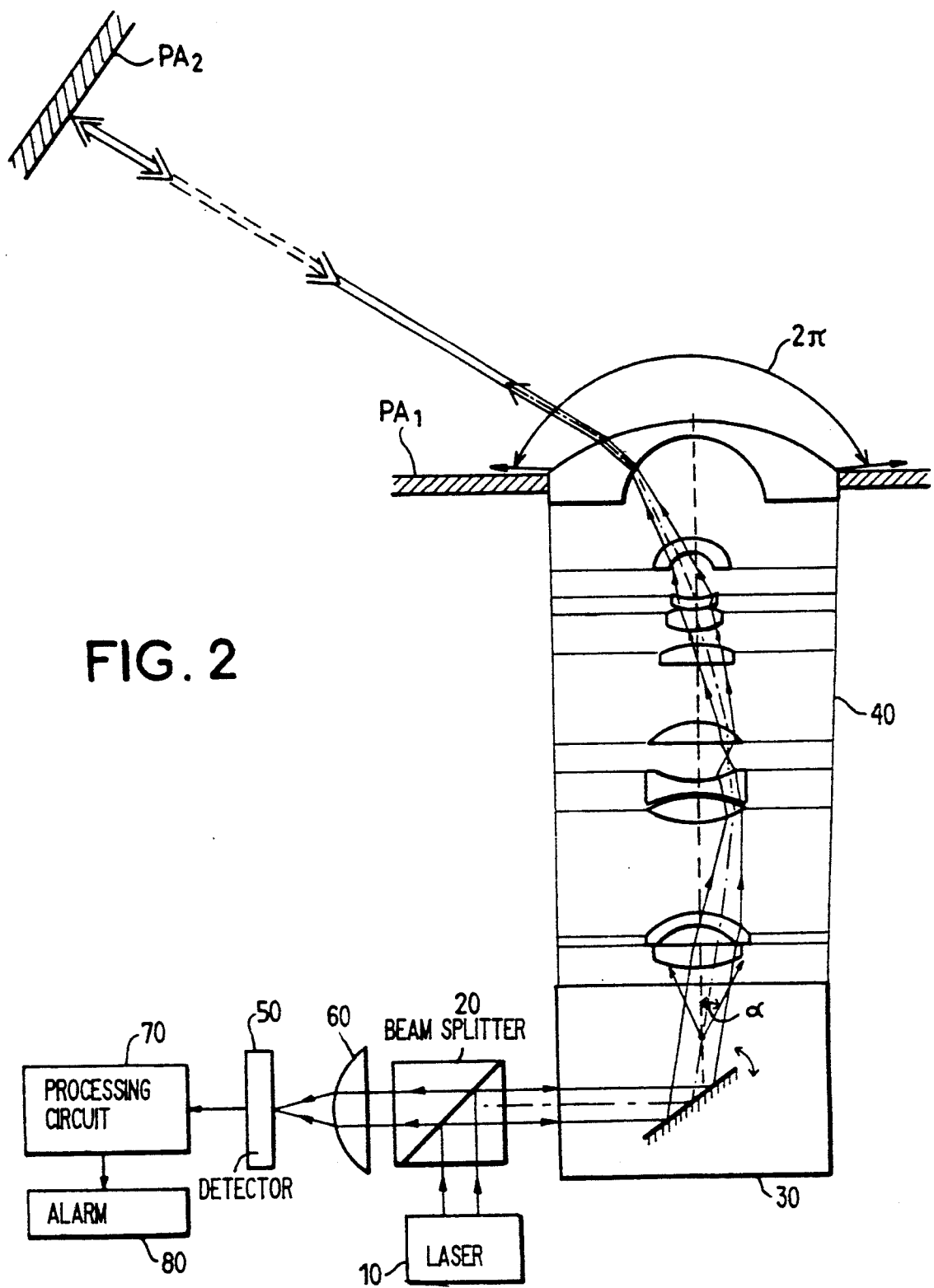
FIG. 2 illustrates an embodiment of the optical transceiver device placed on board aircraft.

An embodiment of the optical transceiver device mounted on board aircraft is shown in a sectional view in FIG. 2.

For transmission, it comprises a laser source 10 with a frequency of 10 Hertz for example, and peak power of the order of 10 KW for example. The radiation coming from the laser source is received by an optical beam splitter, namely a device providing for splitting by polarization or a semi-transparent plate, which transmits the beam coming from the laser source to a deflection block 30. This deflection block is, for example, a galvanometrical type of mirror that enables scanning to be done, at its output, through a half angle $\alpha$ of a order of 320 milliradians for example. The laser beam coming from the deflection block is transmitted to a wide-field afocal objective 40 which, through the 320-mRad sweep at the output of the deflection block, enables the scanning of the entire volume of space on $2\pi$ radians. With the values indicated here above, a magnification of 5 enables the $2\pi$ steradians to be covered, and the transmission channel is thus completely defined.

For reception, the reflected radiation is received by the sam afocal objective 40 which sends on the received radiation towards the beam splitter means 20, the received beam being transmitted towards a detector 50. The photosensitive detector may be of the photodiode, charge-coupled device or photodiode matrix type and, for more efficient detection, a focusing objective 60 enables the radiation reflected by a source of danger to be focused on the detector 50 placed in the plane of the image formed by the objective 40. The photosensitive zone of the detector is matched with the transmission wavelength of the source used in the transmission device. The detected signal is processed in a reading and processing circuit 70 connected to an alarm 80.

The working of the system by means of a transceiver set borne by a first aircraft, the skin $PA_1$ of which is shown, is as follows: during the scanning of the field covered, the equipment receives, in return, a radiation reflected by a second aircraft, the skin $PA_2$ of which has been shown. This second aircraft itself may also have a similar set, but it may also be without one. In this case, only the equipped aircraft will detect a source of danger existing in its zone of proximity. The other transceiver set borne by the aircraft $PA_1$ to cover the entire field has not been shown in FIG. 2. The system works as follows: each aircraft in a watching state, using the laser sources of its transmission devices, transmits narrow beams that scan the space covered by each of these transmission devices at a determined rate and, in this way, demarcates a proximity zone, the radius of which is the limit of the range of the optical systems. As soon as another aircraft, for example the aircraft whose skin $PA_2$ has been shown, penetrates the thus defined proximity zone of the first carrier, the transmitted laser beam will, in a particular position (or set of positions) of the scanning beam, be reflected by the aircraft $PA_2$. The reflected laser radiation is detected by the reception means of the equipment provided for this purpose on the aircraft $PA_1$. The instant of detection of the radiation reflected by the source of danger constituted by the aircraft $PA_2$ makes it possible to give the direction in which this source of danger is located. The watching phase is then ended and the carriers can enter an active phase designed to avert this danger, for example by path modifications.

For this purpose, the transceiver devices may be complemented by modulation devices and a chronometer system may be used to deduce the distance of the source of danger from the transmission-reception times, as is done conventionally in telemetry.

A system such as this detects the aircraft present in the potential collision zone without any action by these aircraft. However, there may be cases wherein the reflectivity of the source of danger is too small for this source to be capable of being detected by a simple reflection, on the fuselage, of the laser radiation scanning the space. It is possible to envisage improving the "visibility" of the dangers constituted by all the aircraft without their being fitted out with optical transceiver devices, simply by providing for a special coating placed on the body of an aircraft which improves its reflectivity, or a particular device having a large laser cross-section (or LCS according to the conventionally used terminology).

In one embodiment, the following elements have been chosen to constitute the transceiver device:

the transmission is done by a laser source at a rate of 10 KHz and a peak power of 10 KW, the semi-divergence of the beam at the output of this source being of the order of 20 milliradians. The wide-field afocal objective used for the transmission of the beam is constituted by a set of 10 optical elements as shown in FIG. 1, where the support has not been shown, for a transmission value evaluated at 0.8.

With regard to the reception, the detector is provided with an interference filter and its sensitivity has been evaluated at $10^{-9}$ watts, this detector being an avalanche type detector. For a system such as this, applied to the detection of a source of danger having a possibly amplified laser cross-section (LCS) of 1000 m$^2$, and atmospheric transmission conditions such that the transmission is 0.8 for one kilometer (i.e. under good meteorological conditions), the system has a range of 1300 meters.

With unfavorable meteorological conditions, namely transmission of 0.1 for one kilometer (i.e. especially critical meteorological conditions), the system as described here above has a range of 850 meters. With the values indicated, the entire volume of space is examined in two seconds.

What is claimed is:

1. A method for the avoidance of collisions among aircraft, comprising the steps of:

transmitting, through a deflection means, a monochromatic optical radiation from an aircraft fitted with a wide-field optical transceiver means said monochromatic radiation scanning space around the aircraft and thus defining a zone of proximity;

receiving, through the deflection means, optical radiation of the transmitted monochromatic radiation by objects that are in the zone of proximity; and detecting the optical radiation received to determine a direction of and a distance to the objects in the zone of proximity.

2. The method according to claim 1, wherein the transmitting of the monochromatic radiation is a laser transmission.

3. An optical system to be placed on board an aircraft for implementation of collision-avoidance comprising:

n wide-field optical transceiver devices positioned on the aircraft, n being greater than or equal to 2, each for generating a laser beam;

deflection means for receiving the laser beams generated by the n-wide field optical transceiver devices and for transmitting the generated laser beams to scan a portion of space around the aircraft defining a zone of proximity;

receiving means for receiving, through the deflection means, optical radiation of the transmitted laser beams reflecting off objects in the zone of proximity.

4. The optical system according to claim 10, wherein each optical transceiver device comprises:

a monochromatic light source for generating the laser beam;

optical wide-field means designed to carry out, by means of the scanning by the deflection means, scanning of the zone of proximity;

a beam splitter located between the monochromatic light source and the deflection means to direct the optical radiation received by an objective towards the receiving means; and wherein the deflection means sweeps the laser beam through a cone at a half angle $\alpha$.

5. The optical system according to claim 4, wherein the optical wide-field means comprises a wide-field afocal objective that converts the scanning through a cone at a half angle $\alpha$, at the output of the deflection means, into scanning in a half space at its output.

6. The optical system according to claim 5, wherein the deflection means comprise a galvanometrical mirror.

7. The optical system according to any of the claims 3 to 6, wherein the detection means comprise an objective for focusing of the received optical radiation onto the receiving means.

8. The optical system according to claim 3, wherein the laser beam transmitted is at a frequency of 10 KHz at a peak power of 10 Kw.

* * * * *